US012625417B2

(12) United States Patent
Zhou et al.

(10) Patent No.: US 12,625,417 B2
(45) Date of Patent: May 12, 2026

(54) MOUNTING AND DISMOUNTING ASSEMBLY

(71) Applicant: SHENZHEN LEQI INNOVATION CO., LTD., Shenzhen (CN)

(72) Inventors: Feng Zhou, Shenzhen (CN); Keman Yan, Shenzhen (CN)

(73) Assignee: SHENZHEN LEQI INNOVATION CO., LTD., Shenzhen (CN)

( * ) Notice: Subject to any disclaimer, the term of this patent is extended or adjusted under 35 U.S.C. 154(b) by 111 days.

(21) Appl. No.: 18/422,014

(22) Filed: Jan. 25, 2024

(65) Prior Publication Data

US 2024/0160092 A1 May 16, 2024

Related U.S. Application Data

(63) Continuation of application No. PCT/CN2022/113531, filed on Aug. 19, 2022.

(30) Foreign Application Priority Data

Aug. 25, 2021 (CN) .......................... 202110985118.4

(51) Int. Cl.
*G03B 17/56* (2021.01)
*F16M 11/04* (2006.01)

(52) U.S. Cl.
CPC ......... *G03B 17/566* (2013.01); *F16M 11/041* (2013.01)

(58) Field of Classification Search
CPC .............................. G03B 17/566; F16M 11/041
See application file for complete search history.

(56) References Cited

U.S. PATENT DOCUMENTS 7,871,218 B2 * 1/2011 Frey ................... A61B 1/00128
403/109.8
9,726,963 B1 * 8/2017 Xiao ...................... F16M 13/02
(Continued)

FOREIGN PATENT DOCUMENTS

CN 204699483 U 10/2015
CN 111716278 A 9/2020
(Continued)

OTHER PUBLICATIONS

International Search Report issued in corresponding International application No. PCT/CN2022/113531, mailed Nov. 18, 2022.
(Continued)

*Primary Examiner* — Leon W Rhodes, Jr.

(57) ABSTRACT

A mounting and dismounting assembly is provided, which includes a first fixing member including a base plate with one end provided with an inserting post with a first clamping part and the other end provided with a first connecting part; and a second fixing member including a bottom shell and at least one slider located in the bottom shell. An end of the bottom shell facing the base plate is provided with a first inserting hole for accommodating the inserting post, and an end of the bottom shell away from the base plate is provided with a second connecting part. The slider is located at a peripheral side of the inserting post and slidably connected with the bottom shell. A second clamping part clamped with the first clamping part, and an elastic piece connected with an inner side wall of the bottom shell are provided.

11 Claims, 5 Drawing Sheets

(56)                References Cited

U.S. PATENT DOCUMENTS

|  |  |  |  |  |
|---|---|---|---|---|
| 9,869,423 | B2 * | 1/2018 | Khodapanah | ...... F16M 11/2021 |
| 2008/0023607 | A1 * | 1/2008 | Barker | .................. F16M 13/02 |
|  |  |  |  | 248/309.4 |
| 2019/0138052 | A1 * | 5/2019 | Barnett | ................. G06F 1/1632 |
| 2020/0138174 | A1 * | 5/2020 | Qi | ........................... A45F 5/021 |

FOREIGN PATENT DOCUMENTS

|  |  |  |  |
|---|---|---|---|
| CN | 212160156 U | 12/2020 |  |
| CN | 112206557 A | 1/2021 |  |
| CN | 212591283 U | 2/2021 |  |
| CN | 113568259 A | 10/2021 |  |
| JP | 2006019182 A | 1/2006 |  |
| WO | WO-2008028351 A1 * | 3/2008 | ........... G03B 17/566 |

OTHER PUBLICATIONS

Written Opinion of the International Search Authority in corresponding International application No. PCT/CN2022/113531, mailed Nov. 18, 2022.

* cited by examiner

MOUNTING AND DISMOUNTING ASSEMBLY

TECHNICAL FIELD

The disclosure relates to the technical field of camera accessories, in particular to a mounting and dismounting assembly.

BACKGROUND

With progress of industry and improvement of people's living standards, cameras are increasingly widely used for users to capture images of people or landscapes.

In order to improve capturing effect or other auxiliary functions, external functional components are generally added to cameras, for example, a viewfinder is installed on a camera through a fixing component, or the camera is installed on a tripod through a fixing component so as to facilitate observation of framing effect of the camera by users. However, fixing components in related art are generally integrally provided, which are then connected with the camera and other functional components by screws respectively, which is time-consuming to mount and dismount.

SUMMARY

A main object of the present disclosure is to provide a mounting and dismounting assembly that can be quickly mounted and dismounted, so as to solve a technical problem described above that it is time-consuming to mount and dismount functional components from a camera.

In order to achieve the above object, the mounting and dismounting assembly according to this disclosure includes:

a first fixing member including a base plate, one end of the base plate being provided with an inserting post, the other end of the base plate being provided with a first connecting part, and the inserting post being provided with a first clamping part; and a second fixing member including a bottom shell and at least one slider located in the bottom shell, an end of the bottom shell facing the base plate being provided with a first inserting hole, the inserting post being accommodated in the first inserting hole, and an end of the bottom shell away from the base plate being provided with a second connecting part; the slider being located at a peripheral side of the inserting post and being slidably connected with the bottom shell; and a side of the slider facing the inserting post being provided with a second clamping part clamped with the first clamping part, and a side of the slider away from the second clamping part being provided with an elastic piece connected with an inner side wall of the bottom shell.

In some embodiments, there are two sliders, and the two sliders are oppositely arranged at a circumference of the inserting post; there are at least two first clamping parts oppositely arranged on the inserting post, and each of the at least two first clamping parts is clamped with one of at least two second clamping parts.

In some embodiments, the second fixing member further includes a driving part. The driving part includes a rotating shaft rotatably arranged on the bottom shell, and an end of the rotating shaft is inserted into the bottom shell from a side of the bottom shell and located between the two sliders. An end of the rotating shaft located within the bottom shell is oppositely provided with at least one first abutting joint and at least one second abutting joint which can respectively abut against the two sliders; and an end of the rotating shaft located outside the bottom shell is provided with a handle. The bottom shell is provided with a second inserting hole for passing through of the rotating shaft.

In some embodiments, an inner top surface of the bottom shell is provided with an installation cylinder which is sleeved on the inserting post, and the installation cylinder is provided with a first avoidance notch for passing through by the second clamping part and a second avoidance notch for passing through by the rotating shaft.

In some embodiments, the slider is a U-shaped plate wrapped on the installation cylinder, a sliding bar is provided at an end of the U-shaped plate facing the base plate, and the inner top surface of the bottom shell is provided with a sliding groove for accommodating the sliding bar.

In some embodiments, the bottom shell includes:

a housing with an open lower end; and a cover plate which is detachably connected with the housing and blocks an opening at the lower end of the housing, the second connection part being located on the cover plate.

In some embodiments, the lower end of the housing is provided with a third avoidance notch communicated with the second inserting hole, and the cover plate is provided with an extension piece embedded in the third avoidance notch.

In some embodiments, the first clamping part is a bayonet provided at a side of the inserting post, a lower end of the inserting post is chamfered, and the second clamping part is a chuck gradually enlarging from its end towards the slider.

In some embodiments, a bottom surface of the chuck is an inclined surface, and an inclined surface attached to the bottom surface of the chuck is provided inside the bayonet.

In some embodiments, at least one positioning groove is provided at the end of the bottom shell facing the base plate, and at least one positioning block embedded in the positioning groove is provided at an end of the base plate facing the bottom shell.

In some embodiments, there are two positioning grooves oppositely arranged at a peripheral side of the first inserting hole, the two positioning grooves being V-shaped grooves; there are two positioning blocks arranged on the base plate, the two positioning blocks being triangular blocks.

In some embodiments, the first connecting part is a screw, the inserting post is a hollow cylinder with two open ends, the base plate is provided with a second through hole docked with the hollow cylinder, a stud of the screw is inserted from a bottom of the hollow cylinder to outside of the second through hole, and a screw head of the screw is abutted against a bottom of the base plate.

In some embodiments, a fixing boss is provided between the base plate and the inserting post, and a fixing cavity for accommodating the fixing boss is provided at a side of the bottom shell facing the base plate.

In the mounting and dismounting assembly according to the embodiment of the disclosure, by driving the slider to move, the first clamping part and the second clamping part can be clamped or separated, so that the inserting post can be facilitated to be inserted into the first inserting hole to realize locking or to be removed out of the first inserting hole to realize separation, thereby realizing rapid separation of the first fixing member and the second fixing member, that is, an external object located on the first fixing member and an external object located on the second fixing member can be quickly separated, thus reducing dismounting and mounting time.

DETAILED DESCRIPTION OF THE EMBODIMENTS

Figure 1:
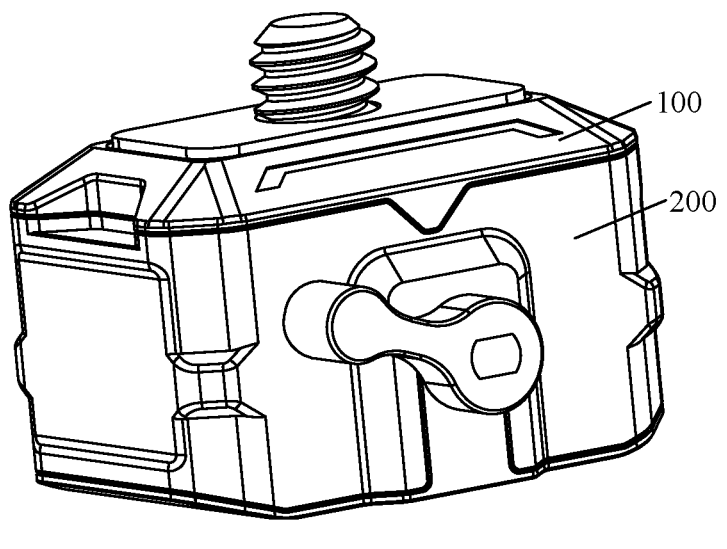
FIG. 1 is a schematic structural view of a mounting and dismounting assembly according to an embodiment of the disclosure.

Embodiments of the present disclosure will be described in detail below, examples of which are shown in the accompanying drawings, in which same or similar reference numerals refer to same or similar elements or elements with same or similar functions throughout. Embodiments described below with reference to the attached drawings are exemplary, and are intended to explain this disclosure, but cannot be understood as limitations of this disclosure. On a basis of the embodiments in this disclosure, all other embodiments obtained by the ordinary skilled in the art without any creative effort are within the protection scope of this disclosure.

A mounting and dismounting assembly is provided in this disclosure, as shown in FIGS. 1 to 5, which includes:

a first fixing member 100 including a base plate 110, one end of the base plate 110 being provided with an inserting post 120, and the other end of the base plate 110 being provided with a first connecting part 130, and the inserting post 120 being provided with a first clamping part 121; and a second fixing member 200 including a bottom shell 210 and at least one slider 220 located in the bottom shell 210, an end of the bottom shell 210 facing the base plate 110 being provided with a first inserting hole 211, the inserting post 120 being accommodated in the first inserting hole 211, and an end of the bottom shell 210 away from the base plate 110 being provided with a second connecting part 230; the slider 220 being located at a peripheral side of the inserting post 120 and being slidably connected with the bottom shell 210; and a side of the slider 220 facing the inserting post 120 being provided with a second clamping part 221 clamped with the first clamping part 121, and a side of the slider 220 away from the second clamping part 221 being provided with an elastic piece 240 connected with an inner side wall of the bottom shell 210.

In this embodiment, a size and shape of the base plate 110 can be adapted to a top surface of the bottom shell 210. For example, the base plate 110 just covers the top surface of the bottom shell 210, and the inserting post 120 is inserted into the first inserting hole 211. The first clamping part 121 can be formed integrally with the inserting post 120, or the first clamping part 121 can be arranged on the inserting post 120 through a spring, and the inserting post 120 is provided with a clamping cavity for accommodating the first clamping part 121, so that the inserting post 120 can be facilitated to be moved out of the first inserting hole 211 or inserted into the first inserting hole 211 after the first clamping part 121 is accommodated in the clamping cavity. As such, after the insertion post 120 is completely inserted into the first inserting hole 211, the first clamping part 121 can be clamped with the second clamping part 221, thereby preventing the insertion post 120 from being separated from the first inserting hole 211. The first connecting part 130 may be a stud, or other connecting part provided according to actual situation. For example, the first connecting part 130 can be fixed with an external object (such as a monitor, a camera, or a camera protective frame) in an inserting or clamping manner.

In some embodiments, the bottom shell 210 is rectangular in shape, and the first inserting hole 211 is a through hole to communicate with inside of the bottom shell 210. The second connecting part 230 may be a stud such that it can fix an external object (such as a bracket, a camera, etc.) through a threaded connection. Of course, the second connecting part 230 can also be a threaded hole. In some embodiments, the slider 220 is connected with an inner wall of the bottom shell 210 in a sliding way. A linear guide rail can be provided between the slider 220 and the bottom shell 210 for sliding connection; or a sliding groove can be provided in the bottom shell 210 or the slider 220, and the slider 220 or the bottom shell 210 is correspondingly inserted into the sliding groove to realize sliding fit. Optionally, the second clamping part 221 is a convex part provided on the slider 220, and the first clamping part 121 can be a clamping port arranged on the inserting post 120, so that clamping can be realized by embedding the convex part into the clamping port. The elastic piece 240 can be a spring. When the slider is not applied with external forces, the slider 220 can move to reset under elasticity of the spring to allow the second clamping part 221 to be located right below the first inserting hole 211. When the inserting post 120 is inserted into the first inserting hole 211, the second clamping part 211 is clamped with the first clamping part 121. The slider 220 may be provided with a pull rod, or a driving part is additionally provided to drive the slider 220 to move and compress the elastic piece 240. In this embodiment, by driving the slider 220 to move, the first clamping part 121 and the second clamping part 221 can be clamped or separated, so that the inserting post 120 can be facilitated to be inserted into the first inserting hole 211 to realize locking or to be moved out of the first inserting hole 211 to realize separation, thereby realizing rapid separation of the first fixing member 100 and the second fixing member 200, that is, an external object located on the first fixing member 100 and an external object located on the second fixing member 200 can be quickly separated, thus reducing dismounting and mounting time.

Figures 3, 4:
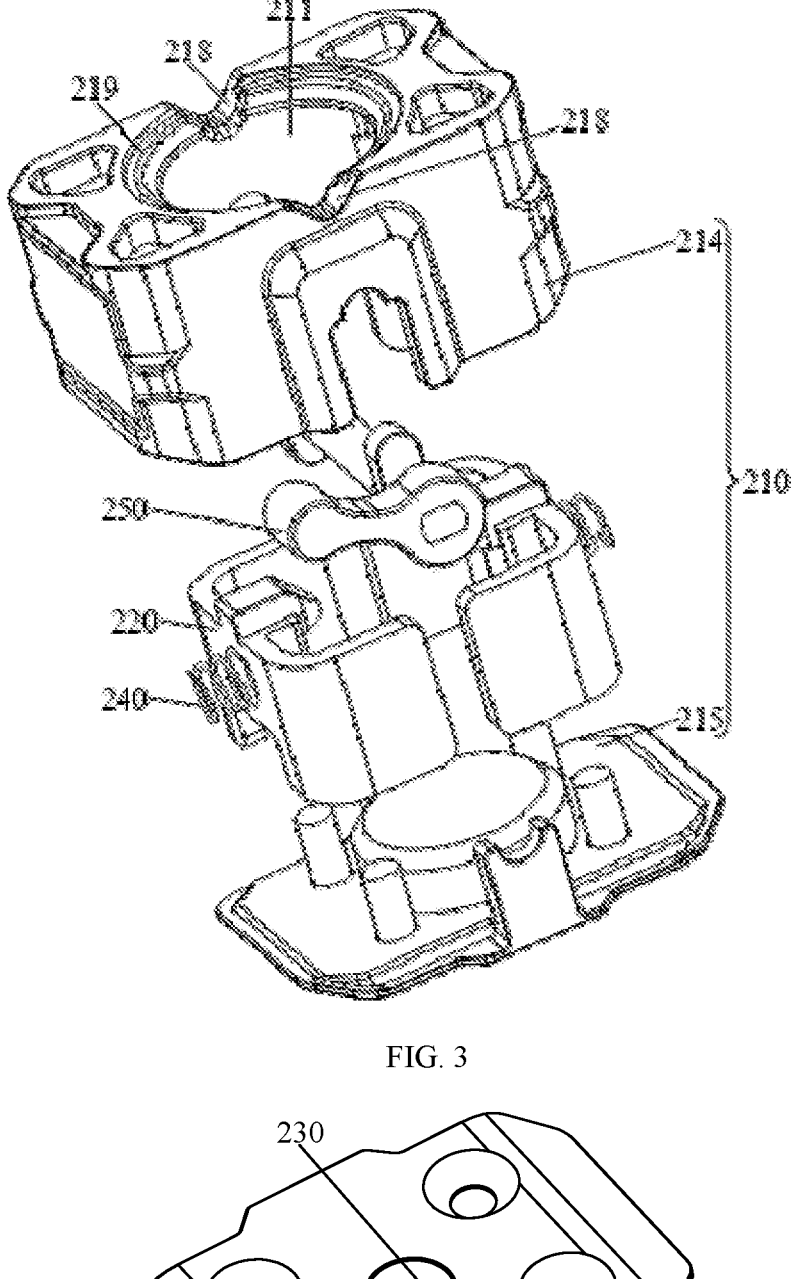
FIG. 3 is an exploded schematic view of a second fixing member shown in FIG. 1.
FIG. 4 is a schematic structural view of a cover plate shown in FIG. 3.
Figure 5:
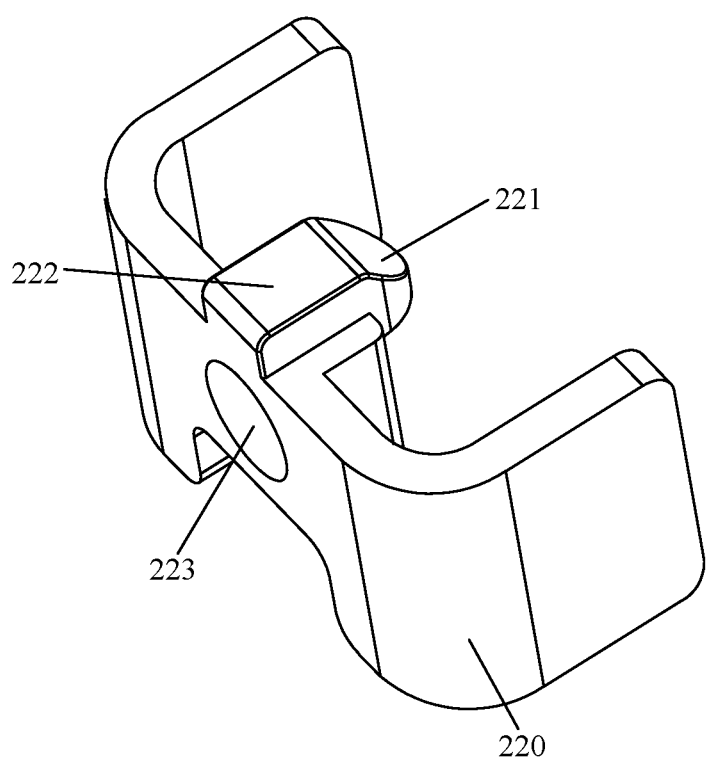
FIG. 5 is a schematic structural view of a slider shown in FIG. 3.
Figure 6:
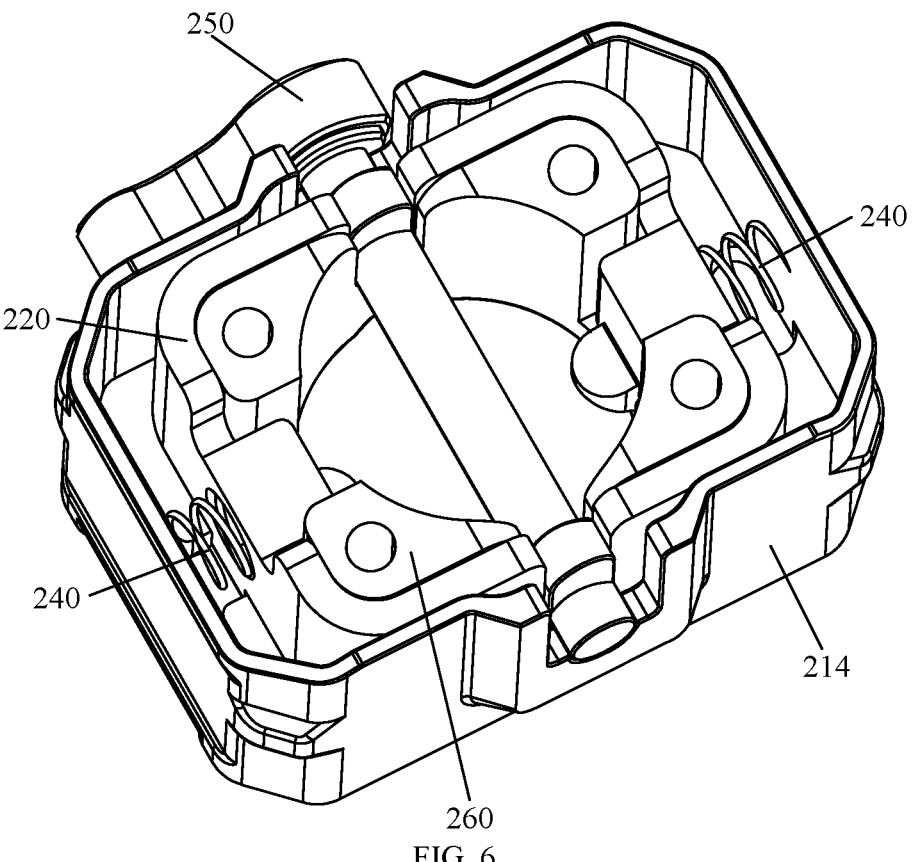
FIG. 6 is a schematic view of a partial structure of the second fixing member shown in FIG. 1.

In some embodiments, as shown in FIG. 3, FIG. 5, and FIG. 6, numbers of the first clamping parts 121, the second clamping parts 221, and the sliders 220 are not limited. In some embodiments, there are two sliders 220, and the two sliders 220 are oppositely arranged at a circumference of the inserting post 120. At least two first clamping parts 121 are oppositely arranged on the inserting post 120, and each of the at least two first clamping parts 121 is clamped with one of at least two second clamping parts 221. The two sliders 220 move towards or away from each other, so that the insertion post 120 can be facilitated to be inserted into or move out of the first inserting hole 211 after the two sliders 220 move away from each other, and after the two sliders move towards each other, the first fixing member 100 can be fixed by clamping the second clamping part 221 with the first clamping part 121. In this embodiment, the second clamping parts 221 on the two sliders 220 are respectively clamped with the two first clamping parts 121 on the inserting post 120, so that stability of connection between the first fixing member 100 and the second fixing member 200 is improved.

Figure 7:
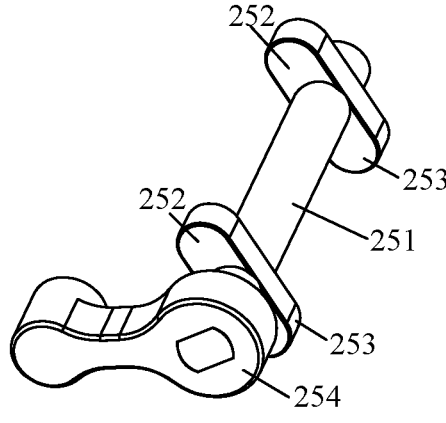
FIG. 7 is a schematic structural view of the driving part shown in FIG. 6.

In some embodiments, as shown in FIGS. 6 and 7, the second fixing member 200 further includes a driving part 250. The driving part 250 includes a rotating shaft 251 rotatably provided on the bottom shell 210, and a side of the rotating shaft 251 is inserted into the bottom shell 210 from a side of the bottom shell 210 and located between two sliders 220. At least one first abutting joint 252 and at least one second abutting joint 253 which can be respectively abutted between two sliders 220 are oppositely arranged at a side of the rotating shaft 251 located inside the bottom shell 210. An end of the rotating shaft 251 located outside the bottom shell 210 is provided with a handle 254, and the bottom shell 210 is provided with a second inserting hole 212 for passing through by the rotating shaft 251. An end of the rotating shaft 251 away from the handle 254 is located between the two sliders 220 or extend from between the two sliders 220 to the second inserting hole 212. The second inserting hole 212 can penetrate through two opposite sides of the bottom shell 210, so that stability during rotation can be improved after the rotating shaft 251 is rotatably arranged in the second inserting hole 212. In some embodiments, an extension direction of the second inserting hole 212 is perpendicular to a sliding direction of the slider 220, or of course, an end of the rotating shaft 251 located inside the bottom shell 210 can be directly connected with its inner side wall in a rotating way. In some embodiments, ends of the first and second abutting joints 252 and 253 are provided with rounded chamfers, that is, the ends of the first and second abutting joints 252 and 253 are rounded, so as to reduce resistance in pressing of the two sliders 220 by the first and second abutting joints 252 and 253 along with rotation of the rotating shaft 251. The first and second abutting joints 252 and 253 can be relatively arranged in a same plane of the rotating shaft 251, that is, the first and second abutting joints 252 and 253 are integrally formed. Of course, the first abutting joint 252 and the second abutting joint 253 can be arranged on the rotating shaft 251 at intervals. Numbers of the first abutting joint 252 and the second abutting joint 253 may be one, two, or more, which is not limited herein. The first abutting joint 252 and the second abutting joint 253 may be located at ends of the two sliders 220 extending along the rotating shaft 251, or at middle areas of the two sliders 220, which is not limited herein. For example, there are one first abutting joint 252 and one second abutting joint 253, which are fixed on both sides of the rotating shaft 251 at intervals. As another example, there are two first abutting joints 252 and two second abutting joints 253, one first abutting joint 252 and one second abutting joint 253 are integrally formed and sleeved on the rotating shaft 251, and the two first abutting joints 252 are arranged in parallel, which facilitates rotation of the handle 254 with balanced driving.

The handle 254 is detachably connected with the rotating shaft 251. For example, the handle 254 is provided with a sleeve hole that can be sleeved on the rotating shaft 251, and a side of an end of the rotating shaft 251 located outside the bottom shell 210 is provided with a limiting plane, so that the handle 254 can facilitate to drive the rotating shaft 251 to rotate after being installed on the rotating shaft 251 through the sleeve hole.

In some embodiments, a positioning opening for accommodating at least some areas of the first abutting joint 252 and the second abutting joint 253 is respectively provided at opposite sides of the two sliders 220, so that ends of the first abutting joint 252 and the second abutting joint 253 which are arranged in a horizontal state or deviate from a vertical state can be accommodated respectively after the rotating shaft 251 rotates, which also facilitates increasing in stability of the two sliders 220 when they are in an open state. In this embodiment, by rotating the handle 254, the first abutting joint 252 and the second abutting joint 253 can be made to be in a horizontal state or a vertical state or deviate from the vertical state, so that it is facilitated that when the first abutting joint 252 and the second abutting joint 253 are rotated from the vertical state to the horizontal state or deviate from the vertical state, the two sliders 220 are driven to move away from each other to compress the elastic piece 240; and when the first abutting joint 252 and the second abutting joint 253 are rotated from a state deviating from the vertical state or from the horizontal state to the vertical state, the two sliders 220 can be driven by the elastic piece 240 to move towards each other, so that it is facilitated that opening and closing of the two sliders 220 can be controlled by rotation of the rotating shaft 251, thus facilitating dismounting and mounting of the first fixing member 100 and the second fixing member 200, and the two sliders 220 are abutted against the first abutting joint 252 and second butt abutting joint 253 in this whole process, improving user's experience and stability.

In some embodiments, as shown in FIG. 5, FIG. 6 to FIG. 8, the inner top surface of the bottom shell 210 is provided with an installation cylinder 260, the installation cylinder 260 is sleeved on the inserting post 120, and the installation cylinder 260 is provided with a first avoidance notch 261 for passing through by the second clamping part 221 and a second avoidance notch 262 for passing through by the rotating shaft 251. The slider 220 is a U-shaped plate wrapped on the installation cylinder 260, a sliding bar 222 is provided at an end of the U-shaped plate facing the base plate 110, and the inner top surface of the bottom shell 210 is provided with a sliding groove 213 for accommodating the sliding bar 222. In some embodiments, the installation cylinder 260 is a rectangular cylinder, and an upper open end of the installation cylinder 260 is docked with the first inserting hole 211, so that the inserting post 120 can be inserted into the installation cylinder 260 from the first inserting hole 211. The first and second avoidance notches 261 and 262 are notches extending upward from a bottom of the installation cylinder 260, and the first and second avoidance notches 261 and 262 are oppositely arranged notches, thus facilitating installation of the driving part 250. Correspondingly, there are two first abutting joints 252 and two second abutting joints 253, and are oppositely arranged on the rotating shaft 251 in pair, thus facilitating abutting against the open end of the U-shaped plate respectively. Of course, a limit protrusion inserted into the first avoidance notch 261 is further provided at an inner side of the U-shaped plate to guide the sliding slider 220, an installation hole 223 is provided at an outer side of the U-shaped plate, and an end of the elastic piece 240 is inserted into the installation hole 223. In this embodiment, the installation cylinder 260 is arranged in the bottom shell 210 and the slider 220 is a U-shaped plate sleeved on the installation cylinder 260, so that stability of the slider 220 in moving and stability of the insertion post 120 being inserted into the first inserting hole 211 can be improved.

In some embodiments, as shown in FIGS. 3 and 4, the bottom shell 210 includes:

a housing 214 with an open lower end; and a cover plate 215 which is detachably connected with the housing 214 and blocks an opening at the lower end of the housing 214, the second connection part 230 being located on the cover plate 215.

A shape and size of the cover plate 215 are adapted to the opening at the lower end of the housing 214, thus facilitating blocking of the lower end of the housing 214. Of course, sealing treatment can be carried out at a joint of the cover plate 215 and the bottom shell 210, such as providing a sealing ring, to improve sealing performance of the bottom shell 210. The cover plate 215 and the housing 214 can be connected by way of using a screw to directly connect the lower end of the housing 214, or can be connected by way of using a screw to connect a lower end of the installation cylinder 260. The second connecting part 230 can be a screw or a threaded hole passing through the cover plate 215, thereby facilitating connection of the second fixing member 200 with an external object. In this embodiment, the bottom shell 210 is divided into the housing 214 and the cover plate 215 which can be detachably connected, thus facilitating arrangement of the slider 220 and other components in the bottom shell 210.

Figure 8:
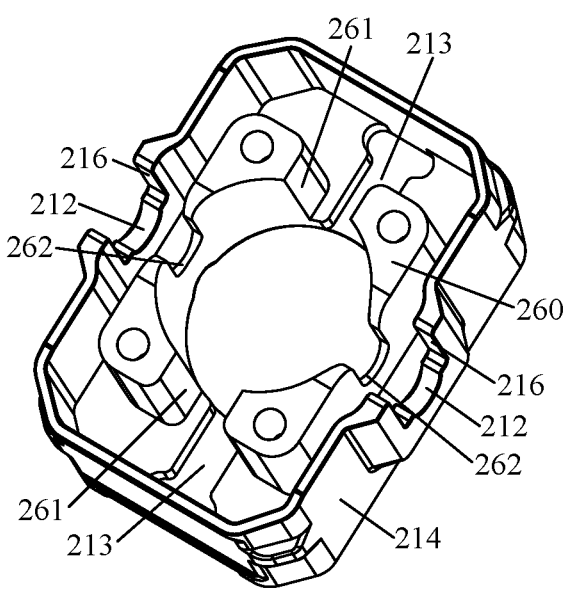
FIG. 8 is a schematic structural view of a housing and an installation cylinder shown in FIG. 6.

In some embodiments, as shown in FIGS. 4 and 8, the lower end of the housing 214 is provided with a third avoidance notch 216 communicated with the second inserting hole 212, and the cover plate 215 is provided with an extension piece 217 embedded in the third avoidance notch 216. The third avoidance notch 216 is a notch extending upward from the lower end of the housing 214, and a size of the notch is adapted to the rotating shaft 251, so that the rotating shaft 251 can be easily installed in the second inserting hole 212 through the third avoidance notch 216, a size and shape of the extension piece 217 can be adapted to the third avoidance notch 216, and the extension piece 217 located in the third avoidance notch 216 can also support and limit the rotating shaft 251 in the second inserting hole 212.

Figure 2:
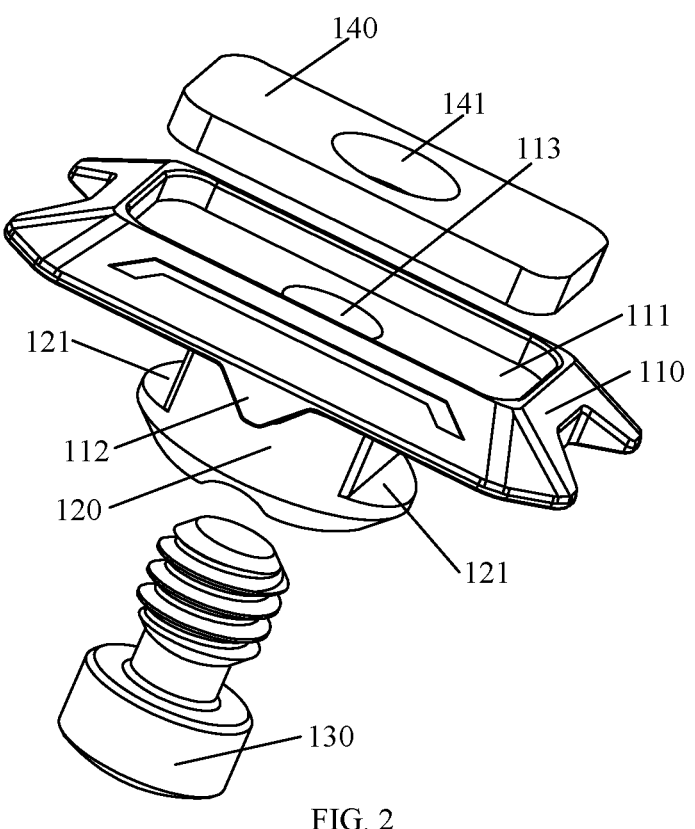
FIG. 2 is an exploded schematic view of a first fixing member shown in FIG. 1.

In some embodiments, as shown in FIGS. 2 and 5, the first clamping part 121 is a bayonet provided at a side of the inserting post 120, a lower end of the inserting post 120 is chamfered, and the second clamping part 221 is a chuck gradually enlarging from its end towards the slider 220. In some embodiments, the second clamping part 221 and the lower end of the inserting post 120 are tapered, and thus it is facilitated that an inclined surface at a top of the second clamping part 221 cooperates with an inclined surface at the lower end of the inserting post 120, so that when the first fixing member 100 is connected with the second fixing member 200 and after the inserting post 120 is inserted into the first inserting hole 211, the two inclined surfaces described above can be used for guiding by pressing the first fixing member 100 hard, and thus the two sliders 220 move away from each other, and after the second clamping part 221 reaches a clamping position, the two sliders 220 are driven by the elastic piece 240 to move towards each other, so that the second clamping part 221 is automatically embedded into the first clamping part 121, thereby realizing clamping between the first clamping part 121 and the second clamping part 221.

In some embodiments, as shown in FIG. 5, an end of the base plate 110 away from the bottom shell 210 is provided with a damping plate 140, and the damping plate 140 is provided with a first through hole 141 for passing through by the first connecting part 130. In some embodiments, an installation cavity 111 is provided at a top of the base plate 110, so as to facilitate installation of the damping plate 140 in the installation cavity 111. As for the damping plate 140, it can be fixed in the installation cavity 111 by gluing, and the damping plate 140 is made of an elastic material, such as rubber, so as to facilitate abutting of the damping plate 140 against an external object to increase a friction force, thereby avoiding rotation of external objects connected with the first connecting part 130.

Figure 9:
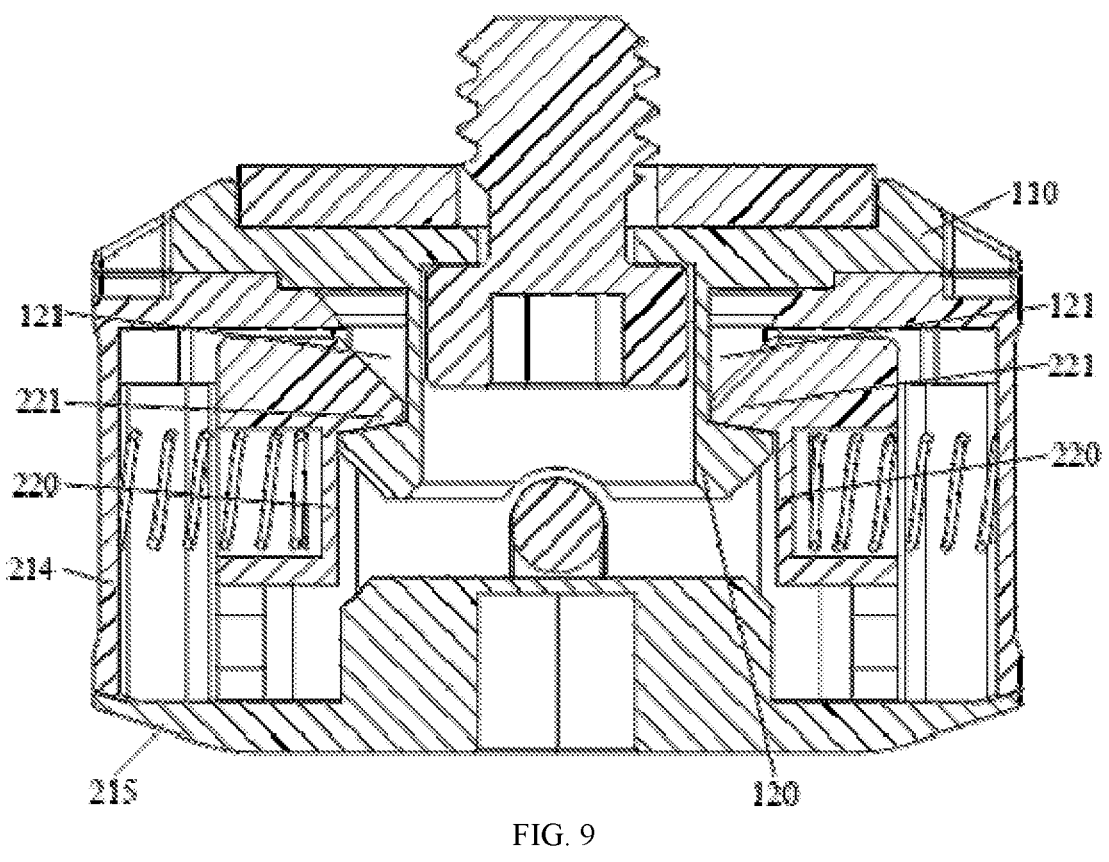
FIG. 9 is a sectional view of the mounting and dismounting assembly shown in FIG. 1 from a perspective.

In some embodiments, as shown in FIG. 9, a bottom surface of the chuck is an inclined surface, and the bayonet is provided with an inclined surface inside of the bayonet to attach with the bottom surface of the chuck. The inclined surface inside the bayonet is a bottom surface of the bayonet, and an inclined direction and angle of the bottom surface of the bayonet are the same as those of the bottom surface of the chuck, so that the bottom surface of the bayonet and the bottom surface of the chuck can be completely attached to each other, and thus they can guide a process of embedding the chuck into the bayonet, and then the inserting post 120 can be pulled down towards the cover plate 215, so that the inserting post 120 and the slider 220 can be attached tightly, with a compact overall structure.

In some embodiments, as shown in FIGS. 2 and 5, at least one positioning slot 218 can be provided at an end of the bottom shell 210 facing the base plate 110, and an end of the base plate 110 facing the bottom shell 210 is provided with at least one positioning block 112 embedded in the positioning slot 218. Numbers of positioning grooves 218 and positioning blocks 112, as well as arrangement position and shape, can be set according to actual situation, so as to limit rotation of the first fixing member 100 relative to the second fixing member 200 after the first fixing member 100 is connected with the second fixing member 200. For example, the positioning groove 218 can be two V-shaped grooves oppositely arranged at a peripheral side of the first inserting hole 211, and the positioning block 112 can be two triangular blocks arranged on the base plate 110, so that the base plate 110 can be guided and positioned by way of a guiding function and a positioning function of the V-shaped grooves, and rotation of the inserting post 120 in the first inserting hole 211 can be limited. There may be four positioning slots 218 and positioning blocks 112, which are opposite to each other in pair.

In some embodiments, as shown in FIG. 2, the first connecting part 130 is a screw, the inserting post 120 is a hollow cylinder with two open ends, the base plate 110 has a second through hole 113 docked with the hollow cylinder, a stud of the screw is inserted from a bottom of the hollow cylinder to outside of the second through hole 113, and a screw head of the screw is abutted against a bottom of the base plate 110. The screw is inserted into the second through hole 113 from a lower end of the hollow cylinder, and is also inserted into the first through hole 141 to expose some areas, so as to facilitate connection with external objects, and a screw head of the screw abuts against the bottom of the base plate 110 to prevent the screw from moving out of the second through hole 113.

Figure 10:
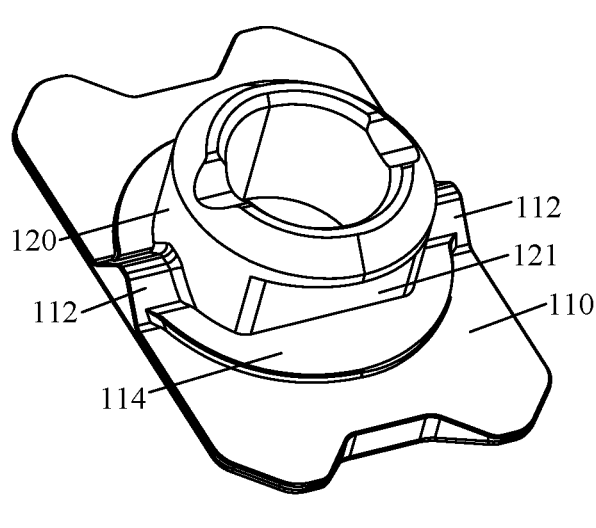
FIG. 10 is a schematic view of a partial structure of the first fixing member shown in FIG. 2.

In some embodiments, as shown in FIGS. 3 and 10, a fixing boss 114 is provided between the base plate 110 and the inserting post 120, and a fixing cavity 219 for accommodating the fixing boss 114 is provided at a side of the bottom shell 210 facing the base plate 110. In some embodiments, the base plate 110, the fixing boss 114, and the inserting post 120 are integrally formed, and the fixing boss 114 can be of any shape, such as a round, polygonal, or irregular block, etc., and the round block is preferred. The fixing boss 114 is easy to be processed, the fixing cavity 219 is formed by recessing a side of the bottom shell 210 facing the base plate 110 inward, is located at an open end of the first inserting hole 211 facing the base plate 110, and is adapted to the fixing boss 114. The fixing cavity is closely attached to the fixing boss, so that a small fit gap can be realized, which facilitates insertion of the fixing boss 114 and the insertion post 120 into the first inserting hole 211 and then embedding into the fixing cavity 219, so as to prevent the insertion post 120 from shaking in the first inserting hole 211. As such, the insertion post 120 does not need to be just adapted to the first inserting hole 211, and the insertion post 120 can be smaller than the first inserting hole 211, thus facilitating insertion of the insertion post 120 into the first inserting hole 211.

The above is only a part or preferred embodiments of the disclosure, and neither the text nor the figures can serve to limit the protection scope of the disclosure. Any equivalent structural transformation made under a concept integral with the disclosure using the specification and drawings of the present disclosure, which is directly or indirectly applied to other related technical fields, is included within the protection scope of the disclosure.

What is claimed is:

1. A mounting and dismounting assembly, comprising:
a first fixing member comprising a base plate, one end of the base plate being provided with an inserting post, the other end of the base plate being provided with a first connecting part, and the inserting post being provided with a first clamping part; and
a second fixing member comprising a bottom shell and at least one slider located in the bottom shell, an end of the bottom shell facing the base plate being provided with a first inserting hole, the inserting post being accommodated in the first inserting hole, and an end of the bottom shell away from the base plate being provided with a second connecting part; the slider being located at a peripheral side of the inserting post and being slidably connected with the bottom shell; and a side of the slider facing the inserting post being provided with a second clamping part clamped with the first clamping part, and a side of the slider away from the second clamping part being provided with an elastic piece connected with an inner side wall of the bottom shell;
wherein there are two sliders, and the two sliders are oppositely arranged at a circumference of the inserting post; there are at least two first clamping parts oppositely arranged on the inserting post, and each of the at least two first clamping parts is clamped with one of at least two second clamping parts;
wherein the second fixing member further comprises a driving part, the driving part comprises a rotating shaft rotatably arranged on the bottom shell, and an end of the rotating shaft is inserted into the bottom shell from a side of the bottom shell and located between the two sliders; an end of the rotating shaft located within the bottom shell is oppositely provided with at least one first abutting joint and at least one second abutting joint which respectively abut against the two sliders; and an end of the rotating shaft located outside the bottom shell is provided with a handle, and the bottom shell is provided with a second inserting hole for passing through of the rotating shaft.

2. The mounting and dismounting assembly according to claim 1, wherein an inner top surface of the bottom shell is provided with an installation cylinder, the installation cylinder is sleeved on the inserting post, and the installation cylinder is provided with a first avoidance notch for passing through by the second clamping part and a second avoidance notch for passing through by the rotating shaft.

3. The mounting and dismounting assembly according to claim 2, wherein the slider is a U-shaped plate wrapped on the installation cylinder, a sliding bar is provided at an end of the U-shaped plate facing the base plate, and the inner top surface of the bottom shell is provided with a sliding groove for accommodating the sliding bar.

4. The mounting and dismounting assembly according to claim 1, wherein the bottom shell comprises:
a housing with an open lower end; and
a cover plate which is detachably connected with the housing and blocks an opening at the open lower end of the housing, the second connection part being located on the cover plate.

5. The mounting and dismounting assembly according to claim 4, wherein the open lower end of the housing is provided with a third avoidance notch communicated with the second inserting hole, and the cover plate is provided with an extension piece embedded in the third avoidance notch.

6. The mounting and dismounting assembly according to claim 1, wherein the first clamping part is a bayonet provided at a side of the inserting post, a lower end of the inserting post is chamfered, and the second clamping part is a chuck gradually enlarging from its end towards the slider.

7. The mounting and dismounting assembly according to claim 6, wherein a bottom surface of the chuck is an inclined surface, and an inclined surface attached to the bottom surface of the chuck is provided inside the bayonet.

8. The mounting and dismounting assembly according to claim 1, wherein at least one positioning groove is provided at the end of the bottom shell facing the base plate, and at least one positioning block embedded in the positioning groove is provided at an end of the base plate facing the bottom shell.

9. The mounting and dismounting assembly according to claim 8, wherein there are two positioning grooves oppositely arranged at a peripheral side of the first inserting hole, the two positioning grooves being V-shaped grooves; there are two positioning blocks arranged on the base plate, the two positioning blocks being triangular blocks.

10. The mounting and dismounting assembly according to claim 1, wherein the first connecting part is a screw, the inserting post is a hollow cylinder with two open ends, the base plate is provided with a second through hole docked with the hollow cylinder, a stud of the screw is inserted from a bottom of the hollow cylinder to outside of the second through hole, and a screw head of the screw is abutted against a bottom of the base plate.

11. The mounting and dismounting assembly according to claim 1, wherein a fixing boss is provided between the base plate and the inserting post, and a fixing cavity for accommodating the fixing boss is provided at a side of the bottom shell facing the base plate.

* * * * *